(12) United States Patent
Cooper

(10) Patent No.: US 9,701,195 B2
(45) Date of Patent: Jul. 11, 2017

(54) DIFFERENTIAL WITH TORQUE COUPLING

(71) Applicant: Dana Automotive Systems Group, LLC, Maumee, OH (US)

(72) Inventor: Kenneth E. Cooper, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 15/070,170

(22) Filed: Mar. 15, 2016

(65) Prior Publication Data

US 2016/0193915 A1   Jul. 7, 2016

Related U.S. Application Data

(63) Continuation-in-part of application No. 14/301,738, filed on Jun. 11, 2014, now Pat. No. 9,625,024.

(Continued)

(51) Int. Cl.
*F16H 48/22* (2006.01)
*B60K 17/348* (2006.01)
(Continued)

(52) U.S. Cl.
CPC ............ *B60K 17/348* (2013.01); *F16D 13/04* (2013.01); *F16D 13/28* (2013.01); *F16D 13/52* (2013.01); *F16H 48/20* (2013.01); *F16H 48/22* (2013.01); *F16D 2023/123* (2013.01); *F16H 48/08* (2013.01); *F16H 2048/343* (2013.01)

(58) Field of Classification Search
None
See application file for complete search history.

(56) References Cited

U.S. PATENT DOCUMENTS 4,805,486 A   2/1989   Hagiwara et al.
4,895,236 A   1/1990   Sakakibara et al.
(Continued)

FOREIGN PATENT DOCUMENTS

DE   102012216709 A1 *  3/2014   ............ B60K 23/08
JP   2004068878 A     3/2004
JP   2010260383 A    11/2010

OTHER PUBLICATIONS

Machine-generated English Translation of JP2004068878A, obtained via Espacenet Patent Search (URL: http://worldwide.espacenet.com/?locale=en_EP).

(Continued)

*Primary Examiner* — Erin D Bishop
(74) *Attorney, Agent, or Firm* — Marshall & Melhorn, LLC

(57) ABSTRACT

A differential assembly with a torque coupling unit. The differential assembly includes a first side gear connected to a first axle half shaft. A clutch can end piece is also connected to the first intermediate shaft. A clutch can is connected to the clutch can end piece. A first plurality of clutch plates extend from the clutch can. A second plurality of clutch plates is interleaved with the first plurality of clutch plates to form a clutch pack. The second plurality of clutch plates extend from a clutch drum. The clutch drum is connected to a second intermediate shaft. A clutch actuator assembly comprises an actuator in driving engagement with a gear set. The gear set drives an actuator plate. The actuator plate is part of a ball ramp assembly used to selectively engage the clutch pack.

10 Claims, 4 Drawing Sheets

Related U.S. Application Data

(60) Provisional application No. 61/834,945, filed on Jun. 14, 2013.

(51) Int. Cl.
*F16D 13/04* (2006.01)
*F16D 13/28* (2006.01)
*F16D 13/52* (2006.01)
*F16H 48/20* (2012.01)
F16H 48/08 (2006.01)
F16H 48/34 (2012.01)
F16D 23/12 (2006.01)

(56) References Cited

U.S. PATENT DOCUMENTS

| | | | |
|---|---|---|---|
| 4,950,214 A | 8/1990 | Botterill |
| 4,955,853 A | 9/1990 | Bausch |
| 5,019,021 A | 5/1991 | Janson |
| 5,033,329 A | 7/1991 | Tezuka |
| 5,080,640 A | 1/1992 | Botterill |
| 5,092,825 A | 3/1992 | Goscenski, Jr. et al. |
| 5,106,349 A | 4/1992 | Botterill et al. |
| 5,279,401 A | 1/1994 | Stall |
| 5,911,643 A | 6/1999 | Godlew et al. |
| 5,966,999 A | 10/1999 | Showalter et al. |
| 6,398,686 B1 | 6/2002 | Irwin |
| 6,460,677 B1 | 10/2002 | Roscoe |
| 6,478,708 B2 | 11/2002 | Krisher |
| 6,537,172 B1 | 3/2003 | McAuliffe, Jr. et al. |
| 6,561,939 B1 | 5/2003 | Knapke |
| 6,719,662 B2 | 4/2004 | Forrest et al. |
| 6,742,640 B1 | 6/2004 | Grogg et al. |
| 6,742,642 B1 | 6/2004 | Stevenson et al. |
| 6,755,763 B1 | 6/2004 | Goto et al. |
| 6,790,154 B1 | 9/2004 | Kelley, Jr. |
| 6,805,653 B2 | 10/2004 | Krzesicki et al. |
| 6,945,374 B2 | 9/2005 | Puiu |
| 6,945,375 B2 | 9/2005 | Kirkwood et al. |
| 6,948,604 B2 | 9/2005 | Puiu |
| 6,959,799 B2 | 11/2005 | Fusegi et al. |
| 6,971,494 B2 | 12/2005 | Puiu |
| 6,991,079 B2 | 1/2006 | Puiu |
| 6,991,080 B2 | 1/2006 | Puiu |
| 6,997,299 B2 | 2/2006 | Brissenden et al. |
| 7,004,873 B2 | 2/2006 | Puiu |
| 7,021,445 B2 | 4/2006 | Brissenden et al. |
| 7,044,880 B2 | 5/2006 | Bowen |
| 7,059,462 B2 | 6/2006 | Brissenden et al. |
| 7,059,992 B1 | 6/2006 | Bowen |
| 7,175,557 B2 | 2/2007 | Kirkwood et al. |
| 7,201,264 B2 | 4/2007 | Puiu |
| 7,201,266 B2 | 4/2007 | Brissenden et al. |
| 7,278,943 B2 | 10/2007 | Puiu |
| 7,294,086 B2 | 11/2007 | Brissenden et al. |
| 7,337,886 B2 | 3/2008 | Puiu |
| 7,338,403 B2 | 3/2008 | Puiu |
| 7,344,469 B2 | 3/2008 | Sharma et al. |
| 7,357,748 B2 | 4/2008 | Kelley, Jr. |
| 7,445,581 B2 | 11/2008 | Cring |
| 7,452,299 B2 | 11/2008 | Teraoka |
| 7,491,146 B2 | 2/2009 | Sharma et al. |
| 7,503,416 B2 | 3/2009 | Sharma et al. |
| 7,506,740 B2 | 3/2009 | Ronk et al. |
| 7,811,194 B2 | 10/2010 | Bowen |
| 7,887,450 B2 | 2/2011 | Fusegi et al. |
| 8,042,642 B2 | 10/2011 | Marsh et al. |
| 8,348,799 B2 | 1/2013 | Maruyama et al. |
| 8,388,486 B2 | 3/2013 | Ekonen et al. |
| 2011/0039652 A1 | 2/2011 | Ekonen et al. |
| 2011/0143878 A1 | 6/2011 | Juenemann et al. |
| 2011/0308875 A1 | 12/2011 | Marsh et al. |
| 2011/0319213 A1 | 12/2011 | Ekonen et al. |
| 2012/0238388 A1 | 9/2012 | Fusegi et al. |
| 2013/0178321 A1 | 7/2013 | Ekonen et al. |
| 2013/0178323 A1 | 7/2013 | Ekonen et al. |
| 2013/0190126 A1 | 7/2013 | Bradford, Jr. |

OTHER PUBLICATIONS

Machine-generated English Translation of JP2010260383A, obtained via Espacenet Patent Search (URL: http://worldwide.espacenet.com/?locale=en_EP).

* cited by examiner

DIFFERENTIAL WITH TORQUE COUPLING

RELATED APPLICATION

The present application claims the benefit of U.S. Provisional Application No. 61/834,945 filed on Jun. 14, 2013, and is a CIP application of U.S. Nonprovisional application Ser. No. 14/301,738, filed on Jun. 11, 2014, both of which are incorporated herein in their entirety by reference.

FIELD OF THE INVENTION

The present invention relates to differentials and associated torque coupling units for a motor vehicle.

BACKGROUND OF THE INVENTION

All-wheel drive vehicles may have a primary full time driveline and a secondary part time driveline, where the secondary driveline provides additional traction under vehicle acceleration or poor traction conditions. A torque coupling may be used in the secondary driveline to limit the torque flow from the primary driveline and to allow for differences in speed between the primary and secondary drivelines. When the secondary driveline is not providing additional traction it continues to rotate and energy is lost overcoming friction and spin loss (oil churning), both of which act to reduce fuel economy. To improve fuel economy, it is desirable to automatically disconnect the secondary driveline to eliminate energy losses.

It would be advantageous to develop a differential and torque coupling unit which may be selectively engaged to increase an efficiency of and to provide additional traction to a driveline the torque coupling unit is incorporated in.

SUMMARY OF THE INVENTION

One embodiment of a torque coupling unit for use with a differential assembly is described. The system has a first side gear connected to a first axle half shaft and a second side gear connected to a first end portion of a first intermediate shaft. A first end of a clutch can end piece is connected to a second end portion of the first intermediate shaft.

The clutch can is connected to a second end of the clutch can end piece. A first plurality of clutch plates extend radially outward from a clutch can outer surface.

A second plurality of clutch plates is interleaved with the first plurality of clutch plates to form a clutch pack. The second plurality of clutch plates extend from an inner surface of a clutch drum. The clutch drum is connected to a second intermediate shaft.

A clutch actuator assembly is disposed radially outboard from the clutch pack. The clutch actuator assembly comprises an actuator in driving engagement with a gear set. The gear set drives an actuator plate. The actuator plate is part of a ball ramp assembly used to selectively engage the clutch pack.

Various aspects of this invention will become apparent to those skilled in the art from the following detailed description of the preferred embodiment, when read in light of the accompanying drawings.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 1:
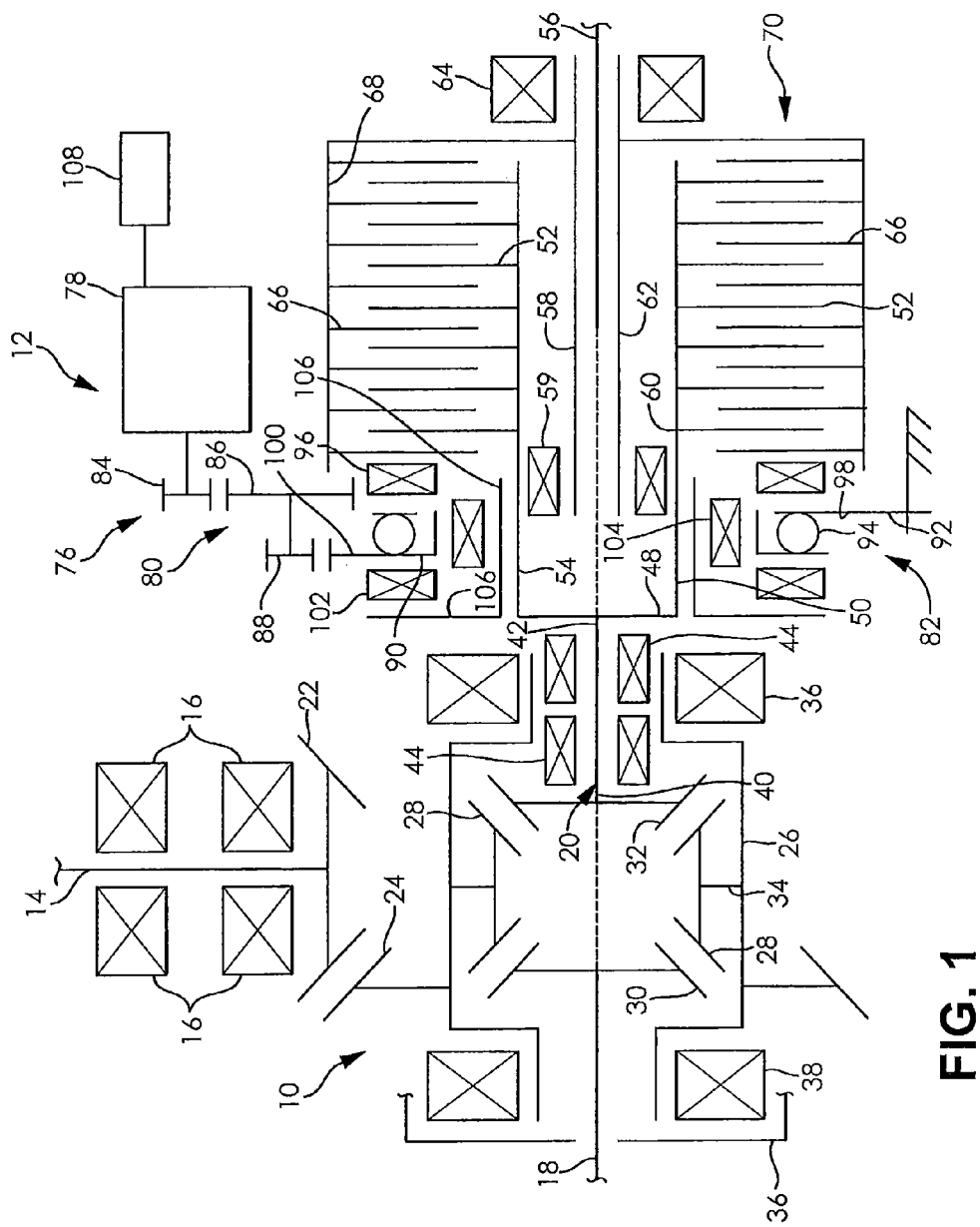
FIG. 1 is a schematic view of one embodiment of a differential and a torque coupling unit.

FIG. 1 illustrates a differential 10 and a torque coupling unit 12. The differential 10 is in driving engagement with a pinion shaft 14. The pinion shaft 14 is rotatably mounted in bearings 16 and is drivingly engaged with a source of rotational power, such as, but not limited to, an internal combustion engine. The differential 10 and the torque coupling unit 12 are respectively drivingly engaged with a first output shaft 18 and an intermediate shaft 20.

The pinion shaft 14 includes a pinion gear 22 mounted thereon that rotates with the pinion shaft 14. The pinion gear 22 is meshed with a ring gear 24 of the differential 10. The pinion gear 22 has a first set of teeth (not shown) and the ring gear 24 has a second set of teeth (not shown). The two sets of teeth are complimentary to one another and are meshed with one another to provide rotational drive from the pinion gear 22 to the ring gear 24.

The differential 10 includes the ring gear 24, a differential case 26, a set of pinion gears 28, and a set of side gears 30, 32. The ring gear 24 is drivingly engaged with the differential case 26; further, it is understood that the ring gear 24 may be integrally formed with the differential case 26, or it may be secured thereto with a plurality of fasteners. It can be appreciated that the connection of the ring gear 24 and the differential case 26 results in rotation of the differential case 22 when the ring gear 24 is driven by the pinion gear 18.

The differential case 26 houses the set of differential pinion gears 28, which are rotatably supported on a spider shaft 34 secured to the differential case 26. More particularly, the set of differential pinion gears 28 are located opposite one another on the spider shaft 34; however, it is understood that the set of differential pinion gears 28 may have other arrangements. The differential pinion gears 28 engage the set of side gears 30, 32. The set of side gears 30, 32 comprise a first side gear 30 and a second side gears 32 adapted to rotate about an axis coincident with an axis of the shafts 18, 20. The differential case 26 is mounted for rotation within a differential housing 36 (partially illustrated). The differential case 26 is mounted on bearings 38 to facilitate rotation within the differential housing 36.

The first output shaft 18 and the intermediate shaft 20 are shown in FIG. 1 extending from the first side gear 30 and the second side gears 32, respectively. The intermediate shaft 20 has a first end portion 40 and a second end portion 42. The first end portion 40 has a set of splines (not shown) on an exterior surface (not shown) that fit within a central aperture (not shown) of the first side gear 30. The central aperture is defined by complimentary, internal splines (not shown). The first output shaft 18 thus turns with the first side gear 30. The intermediate shaft 20 is mounted for rotation within the differential housing 36 on bearings 44, which may be conventional or roller bearings.

The second end portion 42 of the intermediate shaft 20 is connected to a clutch can 48. Thus, the clutch can 48 rotates with the intermediate shaft 20. The clutch can 48 and the intermediate shaft 20 may be integrally formed and unitary with one another or they may be separately formed. If separately formed, the intermediate shaft 20 may be connected to the clutch can 48 by a plurality of fasteners, splines, or the like.

In the depicted embodiment, the clutch can 48 is a hollow, cylindrically shaped member. An outer surface 50 of the clutch can 48 has located thereon a first plurality of clutch plates 52 secured thereto. The first plurality of clutch plates 52 are attached to the clutch can 48 and cannot separate therefrom during operation, but the first plurality of clutch plates 52 are permitted to move axially along the outer surface 50 of the clutch can 48.

An interior 54 of the clutch can 48 houses a second output shaft 56 and a portion of a clutch drum 58. At least a portion of the clutch drum 58 is mounted for rotation within the clutch can 48 on at least one clutch can bearing 59. More particularly, the clutch can bearing 59 is located between an internal surface 60 of the clutch can 48 and an inner surface 62 of the clutch drum 58. The clutch drum 58 is also mounted on a second bearing 64 located outboard from the clutch can bearing 59. The clutch can bearing 59 and the second bearing 64 facilitate rotation of the first clutch drum 58. The second output shaft 56 has a set of splines (not shown) on an exterior surface (not shown) that fit within a central aperture (not shown) of the clutch drum 58. The central aperture is defined by complimentary, internal splines (not shown). The second output shaft 56 thus turns with the clutch drum 58.

The clutch drum 58 is a hollow, cylindrically shaped member. The clutch drum 58 is drivingly engaged with the second output shaft 56 as described hereinabove. The clutch drum 58 houses a second plurality of clutch plates 66 that are located on an internal surface 68 of the clutch drum 58. The second plurality of clutch plates 66 are secured to the internal surface 68. The second plurality of clutch plates 66 are attached to the internal surface 68 and do not separate therefrom during operation, but the second plurality of clutch plates 66 are permitted to move axially along the internal surface 68. The second plurality of clutch plates 66 are interleaved with the first plurality of clutch plates 52. Together, the interleaved clutch plates 52, 66 form a clutch pack 70.

A clutch actuator assembly 76 is located adjacent the clutch pack 70. The clutch actuator assembly 76 comprises an actuator 78, a gear set 80, and a roller and ramp assembly 82. The actuator 78 is in driving engagement with the gear set 80 and the gear set 80 is in driving engagement with the roller and ramp assembly 82.

The actuator 78 may be such as a reversible electric motor as it is compact and easily controllable. It will be appreciated that any other appropriate type of actuator may be used, such as hydraulic or pneumatic, and these are within the scope of the invention.

The actuator 78 drives the gear set 80, which may be a reduction set of gears. In the depicted embodiment, a first gear 84 of the actuator 78 drives a second gear 86 of the gear set 80. The second gear 86 drives a third gear 88 of the gear set 80. The gears 84, 86, 88 achieve a desired torque and speed reduction between the actuator 78 and the third gear 88. Other gear numbers and orientations are possible other than as shown to result in different speeds and torques.

The third gear 88 is in driving engagement with an actuating ring 90 of the roller and ramp assembly 82. More preferably, the actuating ring 90 has a set of teeth (not shown) on an outer radial surface that engages with a plurality of teeth on the third gear 88. The plurality of teeth of the actuating ring 90 is circumferentially extending about the actuating ring 90. The plurality of teeth of the actuating ring 90 may cover a full circumference of the actuating ring 90 or a portion of the circumference. A rotation of the third gear 88 causes the plurality of teeth of the actuating ring 90 to rotate, thus rotating the actuating ring 90.

The roller and ramp assembly 82 also comprises a pressure plate 92 and a plurality of rollers 94. The plurality of rollers 94 are disposed between the pressure plate 92 and the actuating ring 90. Alternatively, a cam disc actuator (not shown), which includes cooperative cam surfaces provided on opposite sides of an actuating ring and a pressure plate, may be used in place of the roller and ramp assembly 82.

The pressure plate 92 applies an axial force to a first axial thrust bearing 96 in order to load the clutch pack 70. The pressure plate 92 is non-rotatably mounted adjacent the first axial thrust bearing 96 but are capable of moving axially. An annular radial surface 98 of the pressure plate 92, which faces the actuating ring 90 is formed with a set of circumferentially extending grooves (not shown) of varying axial depth. The set of circumferentially extending grooves face complementary grooves (not shown) on an opposite annular surface 100 of the actuating ring 90. A depth of the set of circumferentially extending grooves in the opposite annular surface 100 varies in an opposite circumferential sense from the set of circumferentially extending grooves in the annular radial surface 98. A second axial thrust bearing 102 is mounted adjacent the actuating ring 90, to permit the actuating ring 90 to rotate when the roller and ramp assembly 82 is engaged.

The plurality of rollers 94 are one of spheres or elongate rollers. A number of rollers 94 correspond to a number of circumferentially extending grooves formed in each of the opposite annular surface 100 and the annular radial surface 98. The plurality of rollers 94 are disposed between the pressure plate 92 and the actuating ring 90, one in each pair of the circumferentially extending grooves.

It can be appreciated that when the actuator 78 moves the actuating ring 90 angularly relative to the pressure plate 92, the pressure plate 92 is driven axially. As a result, the pressure plate 92 frictionally loads the clutch pack 70. The axial movement of the pressure plate 92 is transmitted to the clutch pack 70 through the first axial thrust bearing 96. The first axial thrust bearing 96 is provided between the pressure plate 92 and the clutch pack 70 to allow for relative rotation and to reduce the friction there between.

A plurality of wave springs (not shown) may be positioned between each of the second plurality of clutch plates 66 to ensure the plates 66 are equally spaced in order to minimize the viscous drag torque between the clutch plates 52, 66. The wave springs also produce a preload to ensure seating of the axial thrust bearings 100, 102 and the roller and ramp assembly 82. A compression of the clutch plates 52, 66 in response to actuation of the roller and ramp assembly 82 causes the clutch plates 52, 66 to rotate together. A connection of the clutch can 48 to the clutch drum 58 through the clutch pack 70 rotates the second output shaft 56 to provide drive thereto, and thus a connected wheel (not shown) which is in driving engagement with the second output shaft 56.

Further, a bearing 104 is located between the actuating ring 90 and a housing 106. The housing 106 is fixed and partially encloses the roller and ramp assembly 82. The bearing 104, in addition to the second axial thrust bearing 102, permits the actuating ring 90 to rotate with respect to the housing 106.

The actuator 78, and thus an operation of the differential 10 and the torque coupling unit 12, is controlled by an electronic control unit 108 (schematically illustrated). Based on an evaluation of conditions according to at least one vehicle parameter, such as but not limited to, wheel speeds, the electronic control unit 108 engages the actuator 78 to place the roller and ramp assembly 82 in a degree of engagement, effecting variable torque transfer from the intermediate shaft 20 to the second output shaft 56 through the clutch pack 70. The differential 10 is thus provided with a limited slip function. When the actuator 78 is not actuated, the differential 10 operates in an open mode without the limited slip function. In the open mode, the pinion shaft 14 is drivingly disengaged, and no torque is distributed to the output shafts 18, 56 through the differential 10.

Figure 2:
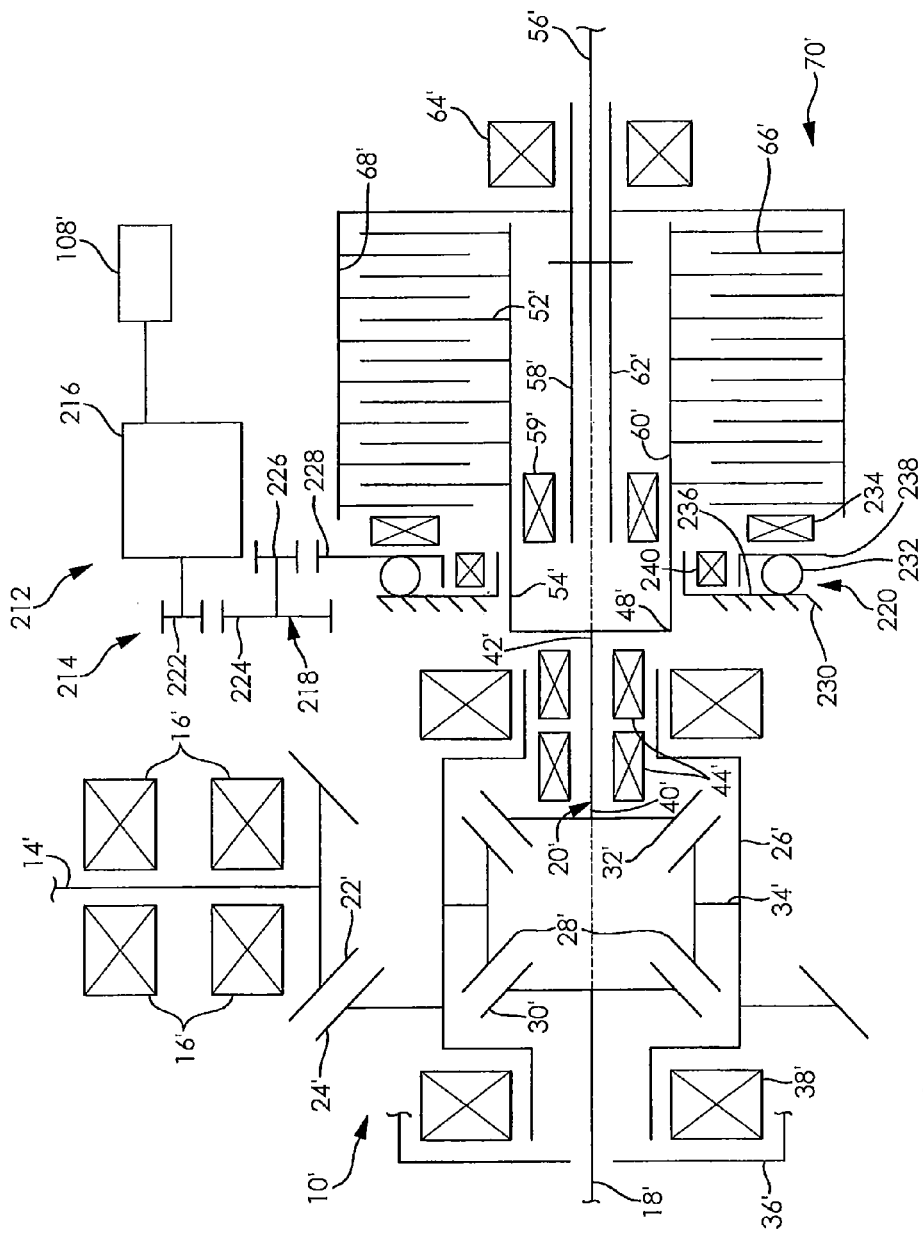
FIG. 2 is a schematic view of another embodiment of a differential and a torque coupling unit.

FIG. 2 illustrates a torque coupling unit 212 according to another embodiment of the invention. The embodiment shown in FIG. 2 includes similar components to the torque coupling unit 12 illustrated in FIG. 1. Similar structural features of the torque coupling unit 212 include the same reference numeral and a prime (') symbol, with the exception of the features described below.

The embodiment of the torque coupling unit 212 shown in FIG. 2 is similar to the torque coupling unit 12, with the exception of the use a clutch actuator assembly 214, which operated similarly to the clutch actuator assembly 76 illustrated in FIG. 1.

The clutch actuator assembly 214 is located adjacent the clutch pack 70'. The clutch actuator assembly 214 comprises an actuator 216, a gear set 218, and a roller and ramp assembly 220. The actuator 216 is in driving engagement with the gear set 218 and the gear set 218 is in driving engagement with the roller and ramp assembly 220.

The actuator 216 may be such as a reversible electric motor as it is compact and easily controllable. It will be appreciated that any other appropriate type of actuator may be used, such as hydraulic or pneumatic, and these are within the scope of the invention.

The actuator 216 drives the gear set 218, which may be a reduction set of gears. In the depicted embodiment, a first gear 222 of the actuator 216 drives a second gear 224 of the gear set 218. The second gear 224 drives a third gear 226 of the gear set 218. The gears 222, 224, 226 achieve a desired torque and speed reduction between the actuator 216 and the third gear 226. Other gear numbers and orientations are possible other than as shown to result in different speeds and torques.

The third gear 226 is in driving engagement with an actuating ring 228 of the roller and ramp assembly 220. More preferably, the actuating ring 228 has a set of teeth (not shown) on an outer radial surface that engages with a plurality of teeth on the third gear 226. The plurality of teeth of the actuating ring 228 is circumferentially extending about the actuating ring 228. The plurality of teeth of the actuating ring 228 may cover a full circumference of the actuating ring 228 or a portion of the circumference. A rotation of the third gear 226 causes the plurality of teeth of the actuating ring 228 to rotate, thus rotating the actuating ring 228.

The roller and ramp assembly 220 also comprises a pressure plate 230 and a plurality of rollers 232. The plurality of rollers 232 are disposed between the pressure plate 230 and the actuating ring 228. Alternatively, a cam disc actuator (not shown), which includes cooperative cam surfaces provided on opposite sides of an actuating ring and a pressure plate, may be used in place of the roller and ramp assembly 220.

The pressure plate 230 resists an axial force, which is applied to a first axial thrust bearing 234 by the actuating ring 228 in order to load the clutch pack 70'. The pressure plate 230 is non-rotatably mounted and spaced apart from the actuating ring 228. The pressure plate 230 may form a portion of a housing (not shown) associated with the torque coupling unit 212. An annular radial surface 236 of the pressure plate 230, which faces the actuating ring 228 is formed with a set of circumferentially extending grooves (not shown) of varying axial depth. The set of circumferentially extending grooves face complementary grooves (not shown) on an opposite annular surface 238 of the actuating ring 228. A depth of the set of circumferentially extending grooves in the opposite annular surface 238 varies in an opposite circumferential sense from the set of circumferentially extending grooves in the annular radial surface 236. The first axial thrust bearing 234, which is mounted adjacent the actuating ring 228, permits the actuating ring 228 to rotate when the roller and ramp assembly 220 is engaged.

The plurality of rollers 232 are one of spheres or elongate rollers. A number of rollers 232 correspond to a number of circumferentially extending grooves formed in each of the opposite annular surface 238 and the annular radial surface 236. The plurality of rollers 232 are disposed between the pressure plate 230 and the actuating ring 228, one in each pair of the circumferentially extending grooves.

It can be appreciated that when the actuator 216 moves the actuating ring 228 angularly relative to the pressure plate 230, the actuating ring 228 is driven axially. As a result, actuating ring 228 frictionally loads the clutch pack 70'. The axial movement of the actuating ring 228 is transmitted to the clutch pack 70' through the first axial thrust bearing 234. The first axial thrust bearing 234 is provided between the actuating ring 228 and the clutch pack 70' to allow for relative rotation and to reduce the friction there between.

Further, a bearing 240 is located between the actuating ring 228 and the pressure plate 230. The bearing 240, in addition to the first axial thrust bearing 234, permits the actuating ring 228 to rotate with respect to the pressure plate 230.

The actuator 216, and thus an operation of the differential 10' and the torque coupling unit 212, is controlled by an electronic control unit 108' (schematically illustrated). Based on an evaluation of conditions according to at least one vehicle parameter, such as but not limited to, wheel speeds, the electronic control unit 108' engages the actuator 216 to place the roller and ramp assembly 220 in a degree of engagement, effecting variable torque transfer from the intermediate shaft 20' to the second output shaft 56' through the clutch pack 70'. The differential 10' is thus provided with a limited slip function. When the actuator 216 is not actuated, the differential 10' operates in an open mode without the limited slip function. In the open mode, the pinion shaft 14' is drivingly disengaged, and no torque is distributed to the output shafts 18', 56' through the differential 10'.

It can be appreciated based on the foregoing that compared with FIG. 1, a bearing has been eliminated in the embodiment of the invention shown in FIG. 2. The removal of a bearing improves fuel economy because it reduces the number of rotating parts. The removal of the bearing also reduces the cost of the assembly.

Figure 3:
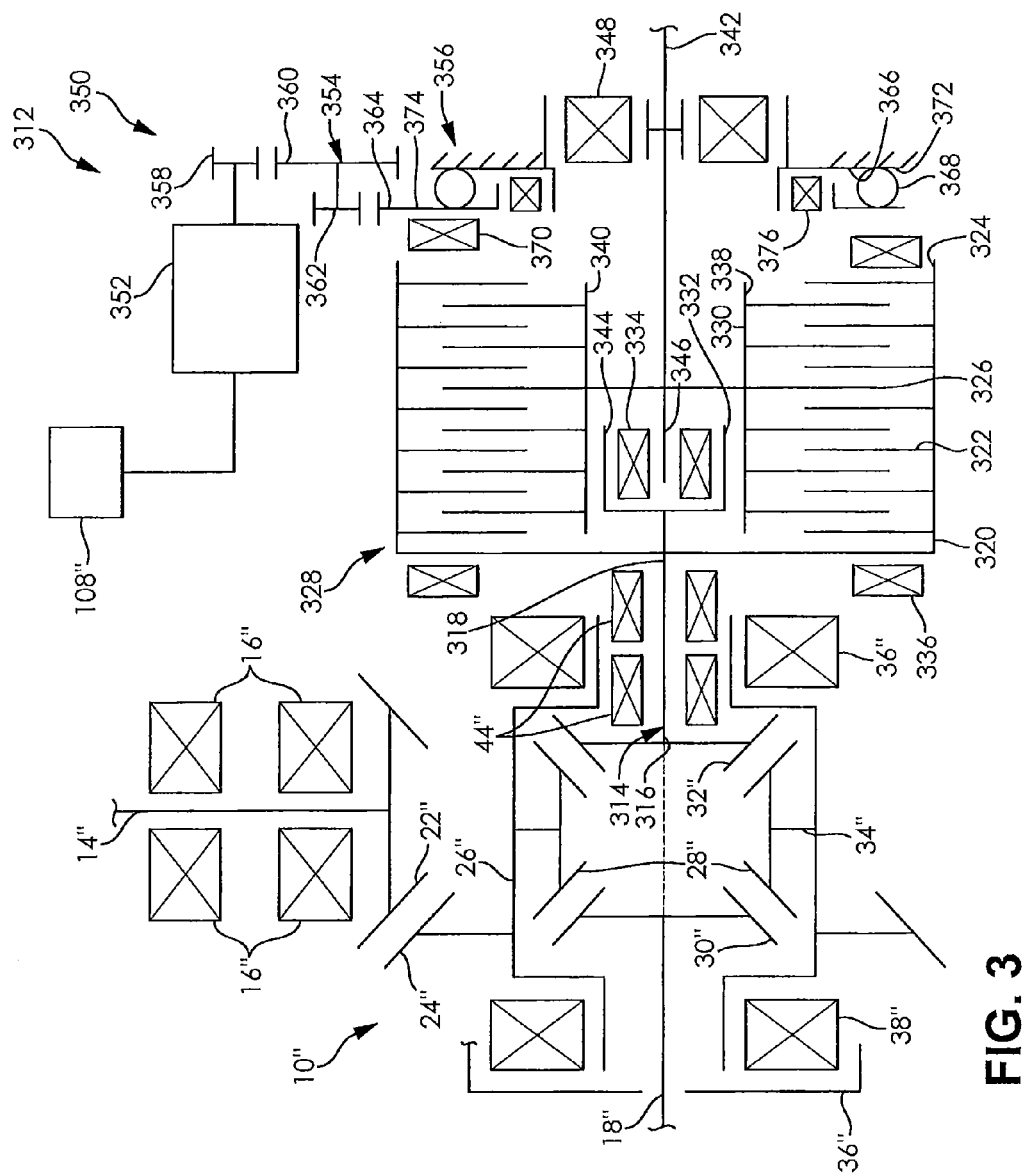
FIG. 3 is a schematic view of yet another embodiment of a differential and a torque coupling unit.

FIG. 3 illustrates a torque coupling unit 312 according to another embodiment of the invention. The embodiment shown in FIG. 3 includes similar components to the torque coupling unit 12 illustrated in FIG. 1. Similar structural features of the torque coupling unit 312 include the same reference numeral and a double prime (") symbol, with the exception of the features described below.

FIG. 3 illustrates a differential 10" and a torque coupling unit 312. The differential 10" is in driving engagement with a pinion shaft 14". The pinion shaft 14" is rotatably mounted in bearings 16" and is drivingly engaged with a source of rotational power, such as, but not limited to, an internal combustion engine. The differential 10" and the torque coupling unit 312 are respectively drivingly engaged with a first output shaft 18" and an intermediate shaft 314.

A differential case 26" houses a set of differential pinion gears 28", which are rotatably supported on a spider shaft 34" secured to the differential case 26". More particularly, the set of differential pinion gears 28" are located opposite one another on the spider shaft 34"; however, it is understood that the set of differential pinion gears 28" may have other arrangements. The differential pinion gears 28" engage a set of side gears 30", 32". The set of side gears 30", 32" comprise a first side gear 30" and a second side gears 32" adapted to rotate about an axis coincident with an axis of the shafts 18", 314. The differential case 26" is mounted for rotation within a differential housing 36" (partially illustrated). The differential case 26" is mounted on bearings 38" to facilitate rotation within the differential housing 36".

The first output shaft 18" and the intermediate shaft 314 are shown in FIG. 3 extending from the first side gear 30" and the second side gears 32", respectively. The intermediate shaft 314 has a first end portion 316 and a second end portion 318. The first end portion 316 has a set of splines (not shown) on an exterior surface (not shown) that fit within a central aperture (not shown) of the first side gear 30". The central aperture is defined by complimentary, internal splines (not shown). The first output shaft 18" thus turns with the first side gear 30". The intermediate shaft 314 is mounted for rotation within the differential housing 36" on bearings 44", which may be conventional or roller bearings.

The second end portion 318 of the intermediate shaft 314 is connected to a clutch drum 320. Thus, the clutch drum 320 rotates with the intermediate shaft 314. The clutch drum 320 and the intermediate shaft 314 may be integrally formed and unitary with one another or they may be separately formed. If separately formed, the intermediate shaft 314 may be connected to the clutch drum 320 by a plurality of fasteners, splines, or the like.

The clutch drum 320 houses a first plurality of clutch plates 322 that are located on an internal surface 324 of the clutch drum 320. The first plurality of clutch plates 322 are secured to the internal surface 324. The first plurality of clutch plates 322 are attached to the internal surface 324 and do not separate therefrom during operation, but the first plurality of clutch plates 322 are permitted to move axially along the internal surface 324. The first plurality of clutch plates 322 are interleaved with a second plurality of clutch plates 326, which are secured to a clutch can 330. Together, the interleaved clutch plates 322, 326 form a clutch pack 328. A support portion 332 within the clutch drum 320 extends in an axial manner and receives a second output shaft bearing 334.

A first axial thrust bearing 336 is provided between a portion of a housing (not shown) and the clutch drum 320 to allow for relative rotation and to reduce the friction there between. The housing may be a portion of the differential housing 36" or another fixed housing.

The clutch can 330 is a hollow, cylindrically shaped member which is at least partially disposed within the clutch drum 320. An outer surface 338 of the clutch can 330 has located thereon the second plurality of clutch plates 326, which are secured thereto. The second plurality of clutch plates 326 are attached to the clutch can 330 and cannot separate therefrom during operation, but the second plurality of clutch plates 326 are permitted to move axially along the outer surface 338 of the clutch can 330.

An interior 340 of the clutch can 330 houses a second output shaft 342. The second output shaft 342 is mounted for rotation within the clutch can 330 on the second output shaft bearing 334. More particularly, the second output shaft bearing 334 is located between an internal surface 344 of the support portion 332 and an outer surface 346 of the second output shaft 342. The second output shaft 342 is also mounted on a second bearing 348 located outboard from the second output shaft bearing 334. The second output shaft bearing 334 and the second bearing 348 facilitate rotation of the second output shaft 342 and the clutch can 330. The second output shaft 342 has a set of splines (not shown) on an exterior surface (not shown) that fit within a central aperture (not shown) of the clutch can 330. The central aperture is defined by complimentary, internal splines (not shown). The second output shaft 342 thus turns with the clutch can 330.

A clutch actuator assembly 350 is located adjacent the clutch pack 328. The clutch actuator assembly 350 comprises an actuator 352, a gear set 354, and a roller and ramp assembly 356. The actuator 352 is in driving engagement with the gear set 354 and the gear set 354 is in driving engagement with the roller and ramp assembly 356.

The actuator 352 may be such as a reversible electric motor as it is compact and easily controllable. It will be appreciated that any other appropriate type of actuator may be used, such as hydraulic or pneumatic, and these are within the scope of the invention.

The actuator 352 drives the gear set 354, which may be a reduction set of gears. In the depicted embodiment, a first gear 358 of the actuator 352 drives a second gear 360 of the gear set 354. The second gear 360 drives a third gear 362 of the gear set 354. The gears 358, 360, 362 achieve a desired torque and speed reduction between the actuator 352 and the third gear 362. Other gear numbers and orientations are possible other than as shown to result in different speeds and torques.

The third gear 362 is in driving engagement with an actuating ring 364 of the roller and ramp assembly 356. More preferably, the actuating ring 364 has a set of teeth (not shown) on an outer radial surface that engages with a plurality of teeth on the third gear 362. The plurality of teeth of the actuating ring 364 is circumferentially extending about the actuating ring 364. The plurality of teeth of the actuating ring 364 may cover a full circumference of the actuating ring 364 or a portion of the circumference. A rotation of the third gear 362 causes the plurality of teeth of the actuating ring 364 to rotate, thus rotating the actuating ring 364.

The roller and ramp assembly 356 also comprises a pressure plate 366 and a plurality of rollers 368. The plurality of rollers 368 are disposed between the pressure plate 366 and the actuating ring 364. Alternatively, a cam disc actuator (not shown), which includes cooperative cam surfaces provided on opposite sides of an actuating ring and a pressure plate, may be used in place of the roller and ramp assembly 356.

The pressure plate 366 resists an axial force, which is applied to a second axial thrust bearing 370 by the actuating ring 364 in order to load the clutch pack 70". The pressure plate 366 is non-rotatably mounted and spaced apart from the actuating ring 364. The pressure plate 366 may form a portion of a housing (not shown) associated with the torque coupling unit 312. An annular radial surface 372 of the pressure plate 366, which faces the actuating ring 364 is formed with a set of circumferentially extending grooves (not shown) of varying axial depth. The set of circumferentially extending grooves face complementary grooves (not shown) on an opposite annular surface 374 of the actuating ring 364. A depth of the set of circumferentially extending grooves in the opposite annular surface 374 varies in an opposite circumferential sense from the set of circumferentially extending grooves in the annular radial surface 372. The second axial thrust bearing 370, which is mounted adjacent the actuating ring 364, permits the actuating ring 364 to rotate when the roller and ramp assembly 356 is engaged.

The plurality of rollers 368 are one of spheres or elongate rollers. A number of rollers 368 correspond to a number of circumferentially extending grooves formed in each of the opposite annular surface 374 and the annular radial surface 372. The plurality of rollers 368 are disposed between the pressure plate 366 and the actuating ring 364, one in each pair of the circumferentially extending grooves.

It can be appreciated that when the actuator 352 moves the actuating ring 364 angularly relative to the pressure plate 366, the actuating ring 364 is driven axially. As a result, actuating ring 364 frictionally loads the clutch pack 70". The axial movement of the actuating ring 364 is transmitted to the clutch pack 70" through the second axial thrust bearing 370. The second axial thrust bearing 370 is provided between the actuating ring 364 and the clutch pack 70" to allow for relative rotation and to reduce the friction there between.

Further, a bearing 376 is located between the actuating ring 364 and the pressure plate 366. The bearing 376, in addition to the second axial thrust bearing 370, permits the actuating ring 364 to rotate with respect to the pressure plate 366.

The actuator 352, and thus an operation of the differential 10" and the torque coupling unit 312, is controlled by an electronic control unit 108" (schematically illustrated). Based on an evaluation of conditions according to at least one vehicle parameter, such as but not limited to, wheel speeds, the electronic control unit 108" engages the actuator 352 to place the roller and ramp assembly 356 in a degree of engagement, effecting variable torque transfer from the intermediate shaft 314 to the second output shaft 342 through the clutch pack 70". The differential 10" is thus provided with a limited slip function. When the actuator 352 is not actuated, the differential 10" operates in an open mode without the limited slip function. In the open mode, the pinion shaft 14" is drivingly disengaged, and no torque is distributed to the output shafts 18", 342 through the differential 10".

A plurality of wave springs (not shown) may be positioned between each of the first plurality of clutch plates 322 to ensure the plates 322 are equally spaced in order to minimize the viscous drag torque between the clutch plates 322, 326. The wave springs also produce a preload to ensure seating of the axial thrust bearings 336, 370 and the roller and ramp assembly 356. A compression of the clutch plates 322, 326 in response to actuation of the roller and ramp assembly 356 causes the clutch plates 322, 326 to rotate together. A connection of the clutch drum 320 to the clutch can 330 through the clutch pack 328 rotates the second output shaft 342 to provide drive thereto, and thus a connected wheel (not shown) which is in driving engagement with the second output shaft 342.

It can be appreciated based on the foregoing that compared with FIG. 1, a bearing has been eliminated in the embodiment of the invention shown in FIG. 3. The removal of a bearing improves fuel economy because it reduces the number of rotating parts. The removal of the bearing also reduces the cost of the assembly.

Figure 4:
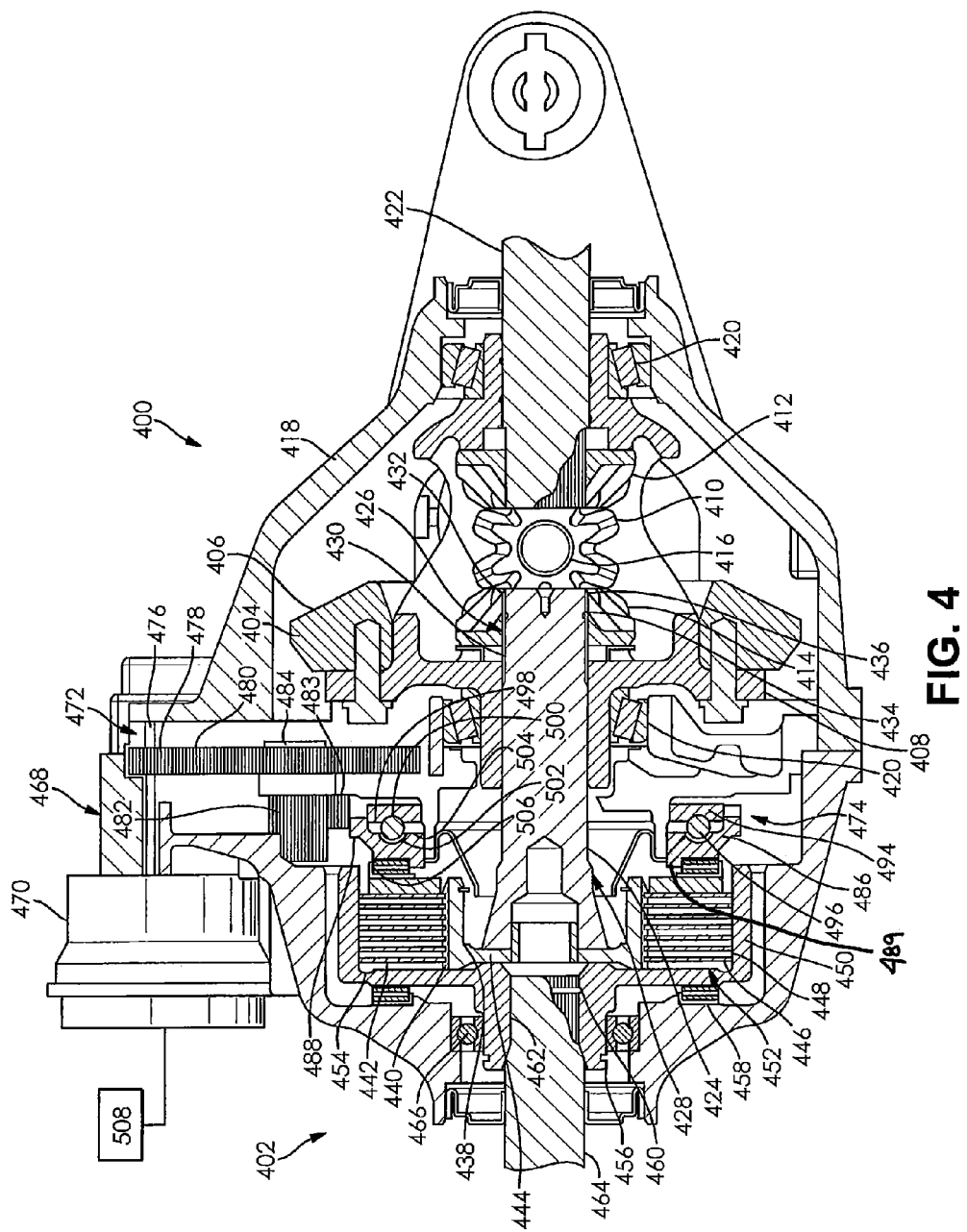
FIG. 4 is a schematic view of yet another embodiment of a differential and a torque coupling unit.

FIG. 4 illustrates a differential 400 and a torque coupling unit 402. The differential 400 is in driving engagement with a pinion shaft (not shown). The pinion shaft is rotatably mounted in bearings (not shown) and is drivingly engaged with a source of rotational power, such as, but not limited to, an internal combustion engine (not shown).

The pinion shaft includes a pinion gear (not shown) mounted thereon that rotates with the pinion shaft. The pinion gear is meshed with a ring gear 404 of the differential 400. The pinion gear has a first set of teeth (not shown) and the ring gear 404 has a second set of teeth 406. The two sets of teeth are complimentary to one another and are meshed with one another to provide rotational drive from the pinion gear to the ring gear 404.

The differential 400 includes the ring gear 404, a differential case 408, a set of differential pinion gears 410, and a set of side gears 412, 414. The ring gear 404 is drivingly engaged with the differential case 408; further, it is understood that the ring gear 404 may be integrally formed with the differential case 408, or it may be secured thereto with a plurality of fasteners. It can be appreciated that the connection of the ring gear 404 and the differential case 408 results in rotation of the differential case 408 when the ring gear 404 is driven by the pinion gear.

The differential case 408 houses the set of differential pinion gears 410, which are rotatably supported on a spider shaft 416 secured to the differential case 408. More particularly, the set of differential pinion gears 410 are located opposite one another on the spider shaft 416; however, it is understood that the set of differential pinion gears 410 may have other arrangements. The differential pinion gears 410 engage the set of side gears 412, 414. The set of side gears 412, 414 comprise a first side gear 412 and a second side gear 414.

The differential case 408 is mounted for rotation within a differential housing 418 (partially illustrated). The differential case 408 is mounted on bearings 420 to facilitate rotation within the differential housing 418. The differential housing 418 is fixed and does not rotate.

A first output shaft 422 and a first intermediate shaft 424 are shown in FIG. 4 extending from the first side gear 412 and the second side gear 414, respectively. The first intermediate shaft 424 has a first end portion 426 and a second end portion 428. The first end portion 426 has a set of splines 430 on an exterior surface 432 that fit within a central aperture 434 of the second side gear 414. The central aperture 434 is defined by complimentary, internal splines 436. The first output shaft 422 turns with the first side gear 412 through a splined connection.

The second end portion 428 of the first intermediate shaft 424 is connected to a clutch can 438. Thus, the clutch can 438 rotates with the first intermediate shaft 424. The clutch can 438 and the first intermediate shaft 424 may be integrally formed and unitary with one another or they may be separately formed. If separately formed, the first intermediate shaft 424 may be connected to the clutch can 438 by a plurality of fasteners, splines, or the like. The second end portion 428 terminates at the clutch can 438.

As mentioned above, the differential case 408 is supported on bearings 420. The first intermediate shaft 424 is not directly supported or in contact with any bearings. Instead, the first intermediate shaft 424 is supported for rotation between the second side gear 414 and the clutch can 438 without any direct contact with bearings.

In the depicted embodiment, the clutch can 438 is a hollow, cylindrically shaped member. An outer surface of the clutch can 440 has located thereon a first plurality of clutch plates 442 secured thereto. The first plurality of clutch plates 442 are attached to the clutch can 438 and cannot separate therefrom during operation, but the first plurality of clutch plates 442 are permitted to move axially along the outer surface 440 of the clutch can 438. The first plurality of clutch plates 442 extend radially outward from the outer surface 440 of the clutch can 438.

The clutch can 438 is located radially outward from the second end portion 428 of the first intermediate shaft 424. More particularly, the clutch can 438 is located concentrically radially outward from the second end portion 428. The clutch can 438 is a hollow, cylindrically shaped member.

The clutch can 438 has an end piece 444 that connects an outboard portion of the clutch can 438 holding the first plurality of clutch plates 442 to the first intermediate shaft 424. Directly connected to the second end portion of the first intermediate shaft 424 is a first end of the clutch can end piece 444 and a second end of the clutch can end piece 444 is directly connected to said outboard portion of the clutch can 438. The end piece 444 extends between the portion holding the first plurality of clutch plates 442 and the intermediate shaft 424 in a substantially radially extending fashion.

A second plurality of clutch plates 446 are interleaved with the first plurality of clutch plates 442. The second plurality of clutch plates 446 extend radially inward from an internal surface 448 of a clutch drum 450. The second plurality of clutch plates 446 are attached to the internal surface 448 and do not separate therefrom during operation, but the second plurality of clutch plates 446 are permitted to move axially along the internal surface 448. Together, the interleaved clutch plates 442, 446 form a clutch pack 452.

Based on the foregoing and FIG. 4, it can be appreciated that the clutch drum 450 is located radially outward and concentric with the clutch can 438. The clutch drum 450 is a hollow, cylindrically shaped member.

The clutch drum 450 has an end piece 454 that connects an outboard portion of the clutch drum 450 holding the second plurality of clutch plates 446 to a second intermediate shaft 456. The clutch drum end piece 454 extends between the portion holding the second plurality of clutch plates 446 and the second intermediate shaft 456 in a substantially radially extending fashion. The clutch drum end piece 454 extends axially outboard and radially beyond the clutch can end piece 444; the clutch drum end piece is parallel the clutch can end piece. A first thrust bearing 458 is located between the clutch drum end piece 454 and the differential housing 418. The first thrust bearing 458 is located radially adjacent the clutch pack 452 but axially outboard therefrom.

As shown in FIG. 4, the depicted embodiment results in the clutch drum 450 extending axially inboard to be at least partially radially concentric with the clutch can 438. In addition, the axial inboard extension of the clutch drum 450 causes it to be at least partially radially concentric with the first intermediate shaft 424.

The second intermediate shaft 456 extends axially outward from the clutch drum end piece 454. The second intermediate shaft 456 may have a plurality of splines 460 for engaging with complimentary splines 462 on a second output shaft 464. The second output shaft 464 is axially and radially aligned with the second intermediate shaft 456 and the first intermediate shaft 424.

The second intermediate shaft 456 is mounted for rotation within the differential housing 418 on a bearing 466. The bearing 466 is located at the intersection of the second intermediate shaft 456 and the second output shaft 464.

A clutch actuator assembly 468 is located adjacent the clutch pack 452. The clutch actuator assembly 468 comprises an actuator 470, a reduction gear set 472, and a roller and ramp assembly 474. The actuator 470 is in driving engagement with the gear set 472 and the gear set 472 is in driving engagement with the roller and ramp assembly 474. The gear set 472 is located radially outboard from the first intermediate shaft 424.

The actuator 470 may be such as a reversible electric motor as it is compact and easily controllable. It will be appreciated that any other appropriate type of actuator 470 may be used, such as hydraulic or pneumatic, and these are within the scope of the invention.

The actuator 470 is non-rotatably mounted to the differential housing 418. Preferably, the actuator 470 is mounted radially outward from the clutch pack 452. Locating the actuator 470 in this location maintains the compact nature of the system.

A drive stub 476 extends axially inboard from the actuator 470. A first gear 478 on the drive stub 476 drives a second gear 480. The second gear 480 is axially aligned with the first gear 478 but located radially inward from the first gear 478.

A third gear 482 is connected to the second gear 480 with a connector shaft 484. The third gear 482 is located axially outboard from the second gear 480. The first, second and third gears 478, 480, 482 may be part of the reduction gear set 472 to achieve a desired torque and speed reduction between the actuator 470 and the third gear 482. Other gear numbers and orientations are possible other than as shown to result in different speeds and torques.

The third gear 482 is in driving engagement with a fourth gear 483. The four gear is in driving engagement with an actuating ring 486 of the roller and ramp assembly 474. More preferably, the actuating ring 486 has a set of teeth 488 on an outer radial surface 490 that engages with a plurality of teeth 492 on the fourth gear 483.

The plurality of teeth 488 of the actuating ring 486 circumferentially extends about the actuating ring 486. The plurality of teeth 488 of the actuating ring 486 may cover a full circumference of the actuating ring 486 or a portion of the circumference. A rotation of the third gear 482 causes the plurality of teeth 488 of the actuating ring 486 to rotate, thus rotating the actuating ring 486.

The roller and ramp assembly 474 also comprises a pressure plate 494 and a plurality of rollers 496. The plurality of rollers 496 are disposed between the pressure plate 494 and the actuating ring 486. Alternatively, a cam disc actuator (not shown), which includes cooperative cam surfaces provided on opposite sides of an actuating ring and a pressure plate, may be used in place of the roller and ramp assembly.

The pressure plate 494 is fixed and does not rotate. The pressure plate 494 is located radially parallel with the actuating ring 486 but axially inboard from the pressure plate 494.

An annular radial surface 498 of the pressure plate 494, which faces the actuating ring 486 is formed with a set of circumferentially extending grooves 500 of varying axial depth. The set of circumferentially extending grooves 500 face complementary grooves 502 on an opposite annular surface 504 of the actuating ring 486. The opposite annular surface 504 is on an inboard side of the ring 486. A depth of the set of circumferentially extending grooves 502 in the opposite annular surface 504 varies in an opposite circumferential sense from the set of circumferentially extending grooves 500 in the annular radial surface 490.

A second thrust bearing 506 is mounted directly axially abutting the actuating ring 486, to permit the actuating ring 486 to rotate when the roller and ramp assembly 474 is engaged. Thus, an outboard side 489 of the actuator ring 486 is in direct contact with the second thrust bearing 506.

The plurality of rollers 496 are one of spheres or elongate rollers. A number of rollers 496 correspond to a number of circumferentially extending grooves 500, 502 formed in each of the opposite annular surface 504 and the annular radial surface 490. The plurality of rollers 496 are disposed between the pressure plate 494 and the actuating ring 486, one in each pair of the circumferentially extending grooves 500, 502.

The actuating ring 486 applies an axial force to the second thrust bearing 506 in order to load the clutch pack 452. The actuating ring 486 is located in direct axial contact with the second thrust bearing 506.

It can be appreciated that when the actuator 470 moves the actuating ring 486 angularly relative to the pressure plate 494, the actuating ring 486 is driven axially outboard. As a result, the actuating ring 486 frictionally loads the clutch pack 452. The axial movement of the actuating ring 486 is transmitted to the clutch pack 452 through the second thrust bearing 506. The second thrust bearing 506 is provided between the actuating ring 486 and the clutch pack 452 to allow for relative rotation and to reduce the friction there between.

A plurality of wave springs (not shown) may be positioned between each of the clutch plates 442, 446 to ensure the plates 442, 446 are equally spaced in order to minimize the viscous drag torque between the clutch plates 442, 446. The wave springs also produce a preload to ensure seating of the thrust bearings 458, 506 and the roller and ramp assembly 474. A compression of the clutch plates 442, 446 in response to actuation of the roller and ramp assembly 468 causes the clutch plates 442, 446 to rotate together. A connection of the clutch can 438 to the clutch drum 450 through the clutch pack 452 rotates the second output shaft 464 to provide drive thereto, and thus a connected wheel (not shown) which is in driving engagement with the second output shaft 464.

The actuator 470, and thus an operation of the differential 400 and the torque coupling unit 402, is controlled by an electronic control unit 508. Based on an evaluation of conditions according to at least one vehicle parameter, such as but not limited to, wheel speeds, the electronic control unit 508 engages the actuator 470 to place the roller and ramp assembly 474 in a degree of engagement, effecting variable torque transfer from the first intermediate shaft 424 to the second output shaft 464 through the clutch pack 452. The differential 400 is thus provided with a limited slip function. When the actuator 470 is not actuated, the differential 400 operates in an open mode without the limited slip function. In the open mode, the pinion shaft is drivingly disengaged, and no torque is distributed to the output shafts 422, 464 through the differential 400.

Compared with the other designs depicted herein, the design depicted in FIG. 4 has fewer bearings. The reduced number of bearings improves fuel economy because it reduces the number of rotating parts. The reduced number of bearings also reduces cost. In addition, the design in FIG. 4 is more axial compact, compared with the designs in FIGS. 1-3, because of the above-described arrangement of parts and the reduced number of bearings. While the compact nature of the design in FIG. 4 can be appreciated based on the foregoing, the compact nature is facilitated by the second thrust bearing 506, the actuator ring 486, the plurality of rollers 496 and the fixed pressure plate 494 being, in axial order, radially aligned with one another and the clutch pack 452.

In accordance with the provisions of the patent statutes, the present invention has been described in what is considered to represent its preferred embodiments, however, it should be noted that the invention can be practiced otherwise than as specifically illustrated and described without departing from its scope or spirit.

What is claimed is:

1. A torque coupling unit for use with a differential assembly, comprising:
   a first side gear connected to a first axle half shaft and a second side gear splined to a first end portion of a first intermediate shaft;
   a clutch can having a clutch can end piece;
   a first end of said clutch can end piece directly connected to a second end portion of said first intermediate shaft, said clutch can end piece extending radially outward from said second end portion;
   an outboard end of said clutch can is directly connected to a second end of said clutch can end piece, said clutch can extending axially inboard from said second end of said clutch can end piece toward said first side gear to be at least partially radially concentric with said second end portion of said first intermediate shaft, wherein a first plurality of clutch plates extend radially outward from an outer surface of said clutch can;
   a clutch drum having a clutch drum end piece;
   a second plurality of clutch plates interleaved with said first plurality of clutch plates to form a clutch pack, said second plurality of clutch plates extending radially inward from an inner surface of said clutch drum, wherein said clutch drum end piece extends radially inward and is directly connected to an outboard end of said clutch drum, wherein said clutch drum extends axially inboard from said clutch drum end piece toward said first side gear to be at least partially radially concentric with said clutch can and said first intermediate shaft;
   a second intermediate shaft directly connected to said radially inward extending clutch drum end piece, said second intermediate shaft mounted for rotation on a bearing located between said second intermediate shaft and a non-rotating differential housing;
   a first thrust bearing located between said housing and said radially inward extending clutch drum end piece;
   a ball ramp assembly comprising an actuator ring, a plurality of rollers and a fixed pressure plate; and
   a clutch actuator assembly disposed radially outboard from said clutch pack, the clutch actuator assembly comprising an actuator in driving engagement with a gear set, the gear set in driving engagement with said actuator ring, wherein a side of said actuator ring opposite said plurality of rollers is directly axially abutting a second thrust bearing and a side of said actuator ring opposite said second thrust bearing comprises said plurality of rollers and said fixed pressure plate of said ball ramp assembly, wherein said second thrust bearing is located directly between said actuator ring and said clutch pack and a single bearing is radially located between said clutch actuator assembly and the first intermediate shaft.

2. The apparatus of claim 1, wherein the first axle half shaft, the first intermediate shaft and the second intermediate shaft are axially aligned with one another.

3. The apparatus of claim 1, wherein said first side gear and said second side gear are part of a differential, said differential mounted within said differential housing on said single bearing radially located between the clutch actuator assembly and the first intermediate shaft and another bearing radially located between said first axle half shaft and the differential housing.

4. The apparatus of claim 1, wherein said gear set is located radially outboard from said first intermediate shaft.

5. The apparatus of claim 1, wherein said radially inward extending clutch drum end piece is parallel but axially offset with said clutch can end piece.

6. A torque coupling unit for use with a differential assembly, comprising:
  a first side gear connected to a first axle half shaft and a second side gear splined to a first end portion of a first intermediate shaft;
  a clutch can having a clutch can end piece;
  a first end of said clutch can end piece directly connected to a second end portion of said first intermediate shaft, said clutch can end piece extending radially outward from said second end portion;
  an outboard end of said clutch can is directly connected to a second end of said clutch can end piece, said clutch can extending axially inboard from said second end of said clutch can end piece toward said first side gear to be at least partially radially concentric with said second end portion of said first intermediate shaft, wherein a first plurality of clutch plates extend radially outward from an outer surface of said clutch can;
  a clutch drum having a clutch drum end piece;
  a second plurality of clutch plates interleaved with said first plurality of clutch plates to form a clutch pack, said second plurality of clutch plates extending radially inward from an inner surface of said clutch drum, wherein said clutch drum end piece extends radially inward and is directly connected to an outboard end of said clutch drum, wherein said clutch drum extends axially inboard from said clutch drum end piece toward said first side gear to be at least partially radially concentric with said clutch can and said first intermediate shaft;
  a second intermediate shaft directly connected to said radially inward extending clutch drum end piece;
  a first thrust bearing located between said housing and said radially inward extending clutch drum end piece;
  a ball ramp assembly comprising an actuator ring, a plurality of rollers and a fixed pressure plate; and
  a clutch actuator assembly disposed radially outboard from said clutch pack, the clutch actuator assembly comprising an actuator in driving engagement with a gear set, the gear set in driving engagement with said actuator ring, wherein a side of said actuator ring opposite said plurality of rollers is directly axially abutting a second thrust bearing and a side of said actuator ring opposite said second thrust bearing comprises said plurality of rollers and said fixed pressure plate of said ball ramp assembly, wherein said second thrust bearing is located directly between said actuator ring and said clutch pack.

7. The apparatus of claim 6, wherein the first axle half shaft the first intermediate shaft and the second intermediate shaft are axially aligned with one another.

8. The apparatus of claim 6, wherein said first side gear and said second side gear are part of a differential, said differential mounted within said differential housing on a single bearing radially located between the clutch actuator assembly and the first intermediate shaft and another bearing radially located between said first axle half shaft and the differential housing.

9. The apparatus of claim 6, wherein said gear set is located radially outboard from said first intermediate shaft.

10. The apparatus of claim 6, wherein said radially inward extending clutch drum end piece is parallel but axially offset with said clutch can end piece.

* * * * *